US009897867B2

(12) United States Patent
Zhong

(10) Patent No.: US 9,897,867 B2
(45) Date of Patent: Feb. 20, 2018

(54) MULTIPLE STEADY STATE LIQUID CRYSTAL DISPLAY PANELS

(71) Applicant: Shenzhen China Star Optoelectronics Technology Co., Ltd., Shenzhen (CN)

(72) Inventor: Xinhui Zhong, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 298 days.

(21) Appl. No.: 14/781,589

(22) PCT Filed: Aug. 20, 2015

(86) PCT No.: PCT/CN2015/087671
§ 371 (c)(1),
(2) Date: Oct. 1, 2015

(87) PCT Pub. No.: WO2017/012161
PCT Pub. Date: Jan. 26, 2017

(65) Prior Publication Data
US 2017/0153507 A1    Jun. 1, 2017

(30) Foreign Application Priority Data

Jul. 20, 2015  (CN) .......................... 2015 1 0427293

(51) Int. Cl.
*C09K 19/00*  (2006.01)
*G02F 1/1343*  (2006.01)
(Continued)

(52) U.S. Cl.
CPC ...... *G02F 1/134309* (2013.01); *G02F 1/1368* (2013.01); *G02F 1/1391* (2013.01);
(Continued)

(58) Field of Classification Search
CPC ......... G02F 1/134309; G02F 1/133345; G02F 1/133514; G02F 1/133711; G02F 1/13439;
(Continued)

(56) References Cited

U.S. PATENT DOCUMENTS

2013/0314655 A1*  11/2013  Archetti ............. C09K 19/3003
                                                      349/124

* cited by examiner

*Primary Examiner* — Ruiyun Zhang
(74) *Attorney, Agent, or Firm* — Leong C. Lei

(57) ABSTRACT

The present application provides a multiple steady state LCD panel, in which a side of a first substrate close to a liquid crystal layer has a first plane electrode and spaced several horizontal electrodes disposed thereon, a side of a second substrate close to the liquid crystal layer has a second plane electrode disposed thereon; the liquid crystal layer includes plural positive liquid crystal molecules and bipolar low molecular weight alignment molecules; thus, to adopt PI materials for the horizontal or perpendicular alignment of the liquid crystal molecules is not needed for the present application. By adjusting one or two of the voltage applied to the first plane electrode and the second plane electrode and the voltage applied to any two of the horizontal electrodes, the positive liquid crystal molecules are arranged at a specific angle under an alignment action of the bipolar low molecular weight alignment molecules.

9 Claims, 3 Drawing Sheets

(51) Int. Cl.
 *G02F 1/1333* (2006.01)
 *G02F 1/1337* (2006.01)
 *G02F 1/1368* (2006.01)
 *G02F 1/1335* (2006.01)
 *G02F 1/139* (2006.01)

(52) U.S. Cl.
 CPC .... *G02F 1/13439* (2013.01); *G02F 1/133345* (2013.01); *G02F 1/133514* (2013.01); *G02F 1/133711* (2013.01); *G02F 2201/124* (2013.01)

(58) Field of Classification Search
 CPC ................ G02F 1/1368; G02F 1/1391; G02F 2201/124; C09K 19/3003; C09K 2019/123; C09K 2019/124
 USPC ..................... 428/1.1; 349/136, 139, 141, 33
 See application file for complete search history.

MULTIPLE STEADY STATE LIQUID CRYSTAL DISPLAY PANELS

FIELD OF THE INVENTION

The present application relates to display technique field, particularly to a multiple steady state LCD panel.

BACKGROUND OF THE INVENTION

In recent years, active thin film transistor liquid crystal displays (TFT-LCD) obtain rapid development and wide applications, such as liquid crystal TVs, mobile phones, personal digital assistants (PDA), digital cameras, computer screens, or notebook computer screens etc.

In terms of the current mainstream market, TFT-LCD panels can be divided into three types: twisted nematic (TN) or super twisted nematic (STN) type, in-plane switching (IPS) type and vertical alignment (VA) type. All of them have preferable display effect, and they are applied in various occasions. Except such three LCD panel types, there are some other LCD panel models, such as optically compensated bend (OCB) model, polymer dispersed liquid crystal (PDLC) model etc.

Usually, a structure of the LCD panel is consisting of a color filter (CF) substrate, a TFT array substrate and a liquid crystal layer disposed between the two substrates; a working principle thereof is that a driving voltage is applied to the two substrates to control liquid crystal molecules of the liquid crystal layer which refracts light of a backlight module to produce pictures. Besides, most of the LCD panels require alignment films made of polyimide (PI) coated on innermost sides of the two substrates and contacting the liquid crystal layer, so as to arrange the liquid crystal molecules perpendicular or parallel to surfaces of the substrate. In case of the types without PI materials, the liquid crystal molecules directly contact electrodes or inorganic insulation layer (such as silicon nitride (SiNx)), and the surfaces of such the types only can arrange the liquid crystal molecules parallel to the surfaces of the substrates.

In present LCD panels, a vast majority of them is a voltage device which requires voltage change and continuous voltage supply to change and maintain display state; once the voltage was removed (voltage 0), the device displays state of voltage 0, then the previous display state of voltage non-zero cannot be kept; in other words, the vast majority of mainstream LCD panels does not have a displaying feature of multiple steady state at the present time, even a display picture is in a static state that does not need change, the continuous voltage supply is still needed for maintaining the display state; thus, this causes greater energy loss, high demand on batteries or shorter battery life; especially in display application of a mobile equipment. An electronic ink display panel, which is a mainstream display panel for use in current electronic books, has multiple steady state display effect, and does not require the continuous voltage supply in the steady state; an electricity supply thereto is required only at a screen refresh; therefore, relative to the LCD panel, it has enormous advantage on power consumption and battery life; however, disadvantages thereof are worse display effect, less resolution, poor colorful degree, and the like that all are lower than the display effect of LCD panel.

SUMMARY OF THE INVENTION

An object of the present application is to provide a multiple steady state LCD panel, which can allow the LCD panel without continuous electricity supply at displaying a static picture, so that the energy consumption is reduced and the battery life of mobile display equipment is increased.

For achieving the above object, the present application provides a multiple steady state LCD panel including a first substrate, a second substrate disposed opposite to the first substrate, a liquid crystal layer interposed between the first substrate the second substrate, a first plane electrode covering the first substrate at a side of the first substrate close to the liquid crystal layer, an insulation layer covering the first plane electrode, several horizontal electrodes mutually spaced and disposed on the insulation layer, and a second plane electrode covering the second substrate at a side of the second substrate close to the liquid layer.

The liquid crystal layer includes plural positive liquid crystal molecules and bipolar low molecular weight alignment molecules.

By adjusting one or two of a voltage applied to the first plane electrode and the second plane electrode and a voltage applied to any two of the horizontal electrodes, the positive liquid crystal molecules are arranged at a specific angle under an alignment action of the bipolar low molecular weight alignment molecules. After the applied voltage was removed, the positive liquid crystal molecules can still keep the state when the voltage is applied thereto, so as to achieve a multiple steady state display.

The bipolar low molecular weight alignment molecules account for 0.02%~5% by weight of the liquid crystal layer.

A molecular weight of the bipolar low molecular weight alignment molecules is in a range of 100-1000.

A structural formula of the bipolar low molecular weight alignment molecules is:

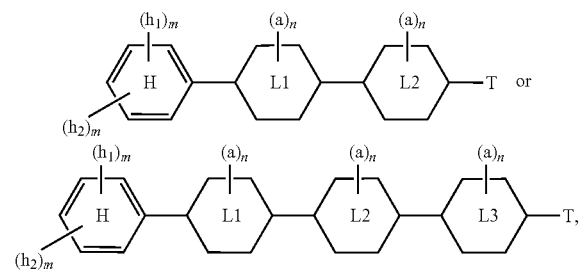

wherein H is a benzene ring structure;

L1, L2, L3 are a benzene rings or saturated six-membered ring structures;

h1 and h2 are substituent groups connected to H of benzene ring; m is a number of h1 or h2 ranging in 0~2; h1 is a substituent including a polymerizable group, the polymerizable group can be selected from substituted or unsubstituted methacrylate-yl, acrylate-yl, epoxy, vinyl, ethyleneoxy, ethynyl and butadienyl; h2 is a polarity group containing heteroatom group(s), a number of the heteroatom group(s) is in 1~4 and selected from one or more than one of following groups: —OH, —SH, —NH2, —O—, —S—, —NHR, —NH—, —NR2, —NR—, -N̍-;

(a) is a substituent group respectively connected to L1, L2, or L3; n is a number of (a) ranging in 0~4; (a) is selected from H, F, Cl, Br, CN, and one of linear or branched alkyl including 1~10 carbon atom(s);

T is a tail end group; the tail end group is a molecular chain including 1~25 carbon atom(s).

A material of the insulation layer is silicon nitride, silicon oxide or a combination thereof.

Materials of the first plane electrode, the second plane electrode, and the several horizontal electrodes are ITO.

One of the first substrate and the second substrate is the TFT substrate, the other one is the CF substrate.

An amount of the horizontal electrodes is two.

The present application further provides a multiple steady state LCD panel including a first substrate, a second substrate disposed opposite to the first substrate, a liquid crystal layer interposed between the first substrate and the second substrate, a first plane electrode covering the first substrate on a side of first substrate close to the liquid crystal layer, an insulation layer covering the first plane electrode, several horizontal electrodes spaced and disposed on the insulation layer, and a second plane electrode covering the second substrate on a side of the second substrate close to the liquid crystal layer;

wherein the liquid crystal layer includes plural positive liquid crystal molecules and bipolar low molecular weight alignment molecules;

by adjusting one or two of the voltage applied to the first plane electrode and the second plane electrode and voltage applied to any two of the horizontal electrodes, the positive liquid crystal molecules are arranged at the specific angle under the alignment action of the bipolar low molecular weight alignment molecules. After the applied voltage was removed, the positive liquid crystal molecules can still keep the state when the voltage is applied thereto, so as to achieve the multiple steady state display;

a material of the insulation layer is silicon nitride, silicon oxide or a combination thereof;

materials of the first plane electrode, the second plane electrode, and the several horizontal electrodes are ITO;

one of the first substrate and the second substrate is the TFT substrate, the other one is the CF substrate.

Advantages of the present application: the present application provides the multiple steady state LCD panel in which the side of the first substrate close to the liquid crystal layer has the first plane electrode and the spaced several horizontal electrodes disposed thereon, the side of the second substrate close to the liquid crystal layer has the second plane electrode disposed thereon; the liquid crystal layer includes the plural positive liquid crystal molecules and the bipolar low molecular weight alignment molecules; thus, to adopt the PI materials for the horizontal or perpendicular alignment of the liquid crystal molecules is not needed for the present application. By controlling a content of the bipolar low molecular weight alignment molecules in the liquid crystal layer, an alignment condition of the liquid crystal molecules is in a critical state that has neither strong perpendicular alignment nor strong horizontal alignment, the arrangement condition thereof is extremely easily affected by external electric field. By adjusting one or two of the voltage applied to the first plane electrode and the second plane electrode and the voltage applied to any two of the horizontal electrodes, the positive liquid crystal molecules are arranged at the specific angle under the alignment action of the bipolar low molecular weight alignment molecules. After the applied voltage was removed, the positive liquid crystal molecules can still keep the state when the voltage is applied thereto, so as to achieve the multiple steady state display that the LCD panel does not require continuously supplying electricity at displaying a static picture, and thus the energy consumption is reduced and the battery life of mobile display equipment is increased.

It is noted that the following descriptions of preferred embodiments of this invention are presented herein for purpose of illustration and description only. It is not intended to be exhaustive or to be limited to the precise form disclosed.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments.

Figure 1:
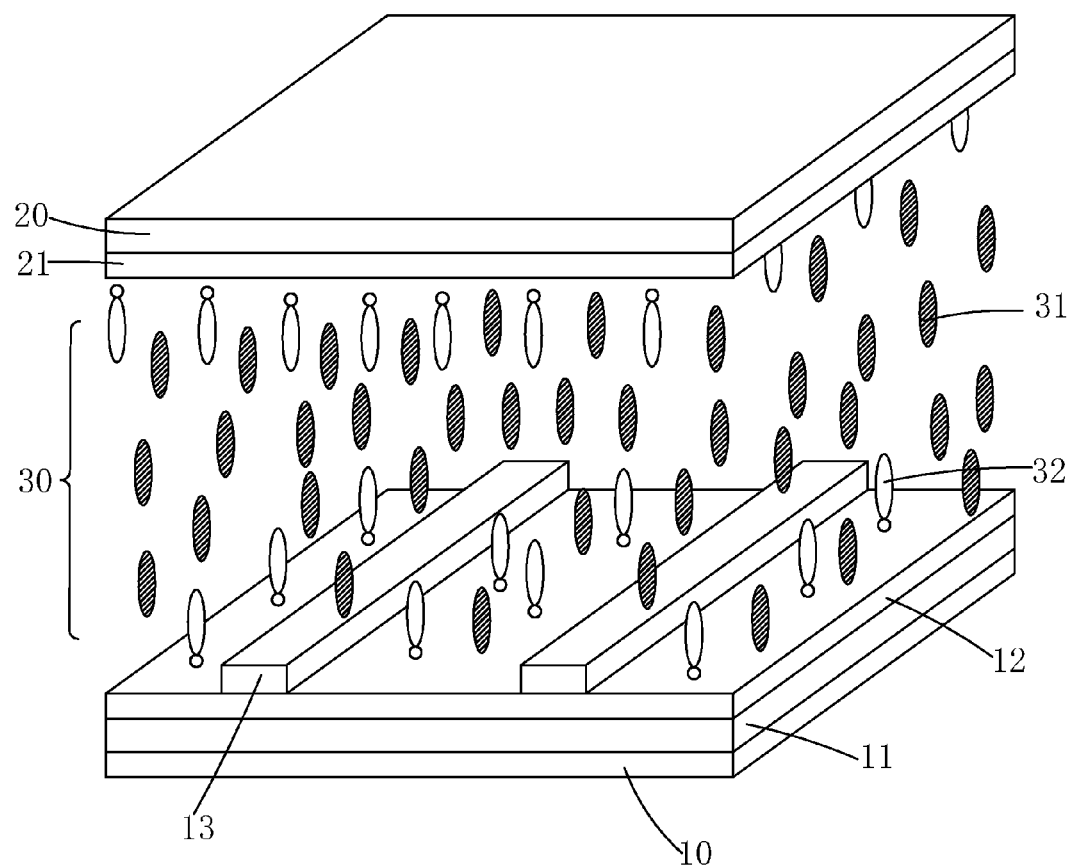
FIG. 1 is a three-dimensional structure view schematically illustrating the multiple steady state LCD panel of the present application.

Please refer to FIG. 1, the present application provides a multiple steady state LCD panel including a first substrate 10, a second substrate 20 disposed opposite to the first substrate 10, a liquid crystal layer 30 interposed between the first substrate 10 and the second substrate 20, a first plane electrode 11 covering the first substrate 10 on a side of the first substrate 10 close to the liquid crystal layer 30, an insulation layer 12 covering the first plane electrode 11, several horizontal electrodes 13 spaced and disposed on the insulation layer 12, and a second plane electrode 21 covering the second substrate 20 on a side of the second substrate 20 close to the liquid crystal layer 30.

A body part of the liquid crystal layer 30 is plural positive liquid crystal molecules 31, and the liquid crystal layer 30 further includes a certain percentage of bipolar low molecular weight alignment molecules 32. A molecular weight of the bipolar low molecular weight alignment molecules 32 is in a range of 100-1000; further, a structural formula of the bipolar low molecular weight alignment molecules 32 is

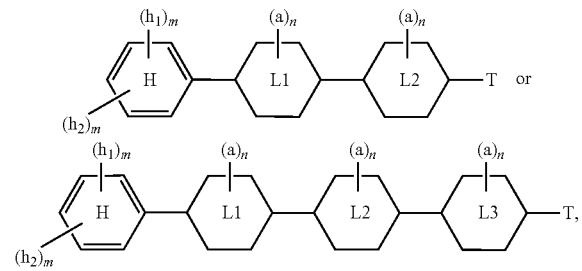

wherein H is a benzene ring structure;

L1, L2, L3 are benzene rings or saturated six-membered ring structures;

$h_1$ and $h_2$ are substituent groups connected to H of benzene rings; m is a number of $h_1$ or $h_2$ ranging in 0~2; $h_1$ is a substituent including a polymerizable group, the polymerizable group can be selected from substituted or unsubstituted methacrylate-yl, acrylate-yl, epoxy, vinyl, ethyleneoxy, ethynyl and butadienyl; $h_2$ is a polarity group containing heteroatom group(s), a number of the heteroatom group(s) is in 1~4 and selected from one or more than one of following groups: —OH, —SH, —NH$_2$, —O—, —S—, —NHR, —NH—, —NR$_2$, —NR—, -N-;

(a) is a substituent group respectively connected to L1, L2, or L3; n is a number of (a) ranging in 0~4; (a) is selected from H, F, Cl, Br, CN, and one of linear or branched alkyl including 1~10 carbon atom(s);

T is a tail end group; the tail end group is a molecular chain including 1~25 carbon atom(s).

For example, one structural formula of the bipolar low molecular weight alignment molecules 32 is

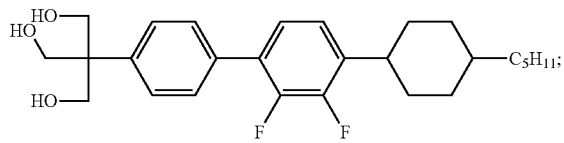

another one structural formula thereof is

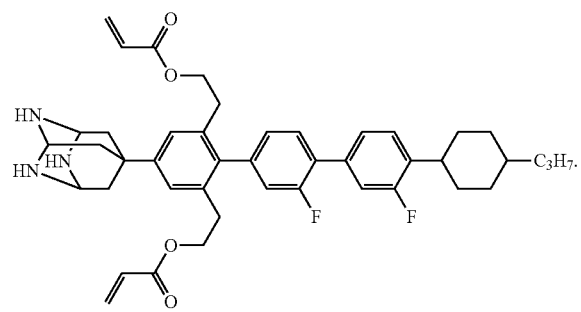

One of the first substrate 10 and the second substrate 20 is the TFT substrate, the other one is the CF substrate. The specific structures of the TFT substrate and the CF substrate are current technique without further description herein.

A material of the insulation layer 12 is silicon nitride (SiNx), silicon oxide or a combination thereof.

Materials of the first plane electrode 11, the second plane electrode 21, and the several horizontal electrodes 13 are indium tin oxide (ITO).

The several horizontal electrodes 13 are arranged in comb shape, an amount of the horizontal electrodes 13 as shown in FIG. 1 is two; certainly, the amount of the horizontal electrodes 13 can be more.

As shown in FIG. 1, it is particularly noted that the LCD panel of the present application does not need to adopt the PI materials for the horizontal or perpendicular alignment of the liquid crystal molecules; that is, there is not an alignment film made of polyimide (PI) coated on inner sides of the two substrates and contacting the liquid crystal layer; the bipolar low molecular weight alignment molecules 32 have strong binding force both to the first substrate 10 and the second substrate 20, and are capable of arranging the positive liquid crystal molecules 31 according to directions perpendicular to the surfaces of the first substrate 10 and the second substrate 20. The ability of the bipolar low molecular weight alignment molecules 32 allowing the positive liquid crystal molecules 31 in the perpendicular arrangement is related to the content thereof in the liquid crystal layer 30, the content thereof is more, the ability of aligning the positive liquid crystal molecules 31 in the perpendicular arrangement is stronger. When the content of the bipolar low molecular weight alignment molecules 32 in the liquid crystal layer 30 is in a certain range, that can allow the alignment condition of the positive liquid crystal molecules 31 being in the critical state that has neither strong perpendicular alignment nor strong horizontal alignment, the final arrangement condition thereof is extremely easily affected by external electric field; once the applied voltage is removed, the positive liquid crystal molecules 31 tend to not change and maintain the original alignment state in the condition of neither electric field effect nor extremely strong aligning force. Due to a variety of the bipolar low molecular weight alignment molecules 32, and aligning force, molecular eight and the like thereof are different, the content of the bipolar low molecular weight alignment molecules 32, that allow the alignment condition of positive liquid crystal molecules 31 being in the aforesaid critical state, in the liquid crystal layer 30 is not fixed; in general, the content of the bipolar low molecular weight alignment molecules 32 accounted for the liquid crystal layer is 0.02%-5% by weight, most preferably 0.1%-2% by weight.

On the LCD panel of the present application displaying, by adjusting one or two of the voltage applied to the first plane electrode and the second plane electrode and the voltage applied to any two of the horizontal electrodes, the positive liquid crystal molecules are arranged at the specific angle under the alignment action of the bipolar low molecular weight alignment molecules. After the applied voltage was removed, the positive liquid crystal molecules can still keep the alignment state when the voltage applied thereon, so as to achieve the multiple steady state display.

Figure 2:
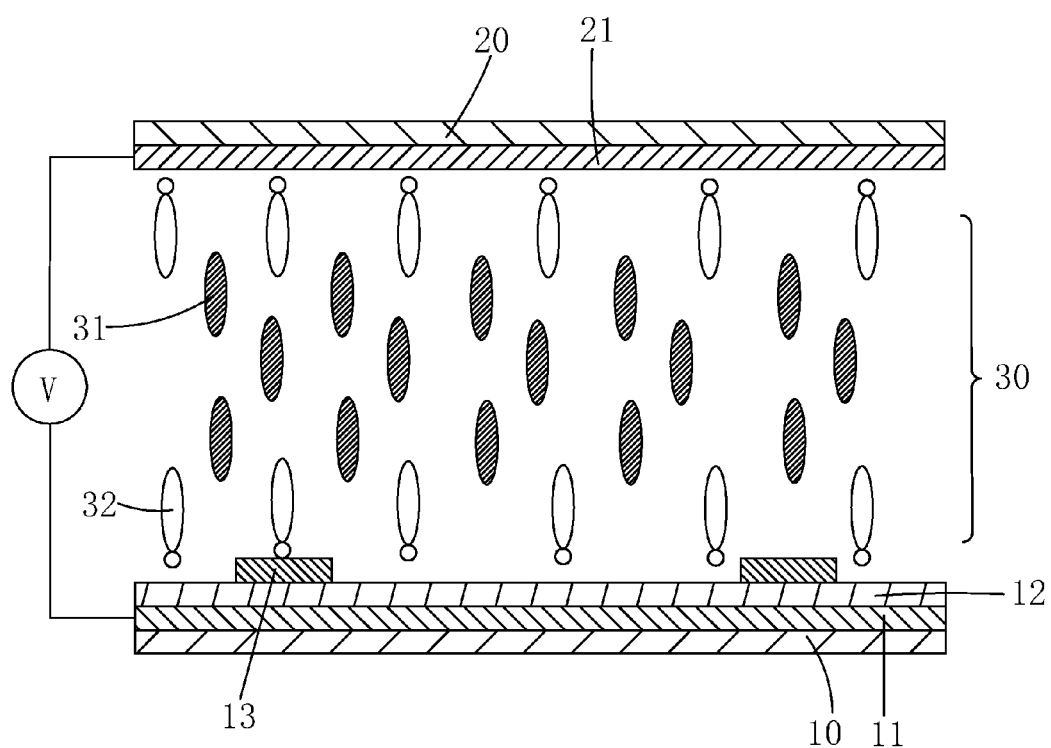
FIG. 2 is a cross-sectional view schematically illustrating the multiple steady state LCD panel when a voltage is applied to the two plane electrodes.

As shown in FIG. 2, when only a strong enough voltage is applied to the first plane electrode 11 and the second plane electrode 21 to form a vertical electric field, rotations of the positive liquid crystal molecules 31 along the direction of vertical electric field occur under the alignment action of the bipolar low molecular weight alignment molecules 32, and then the positive liquid crystal molecules 31 are arranged perpendicular to the surfaces of the first substrate 10 and the second substrate 20. After that, even the applied voltage between the first plane electrode 11 and the second plane electrode 21 is removed; the positive liquid crystal molecules 31 can still keep the state of being arranged perpendicular to the surfaces of the first substrate 10 and the second substrate 20 when the voltage was applied thereto.

Figure 3:
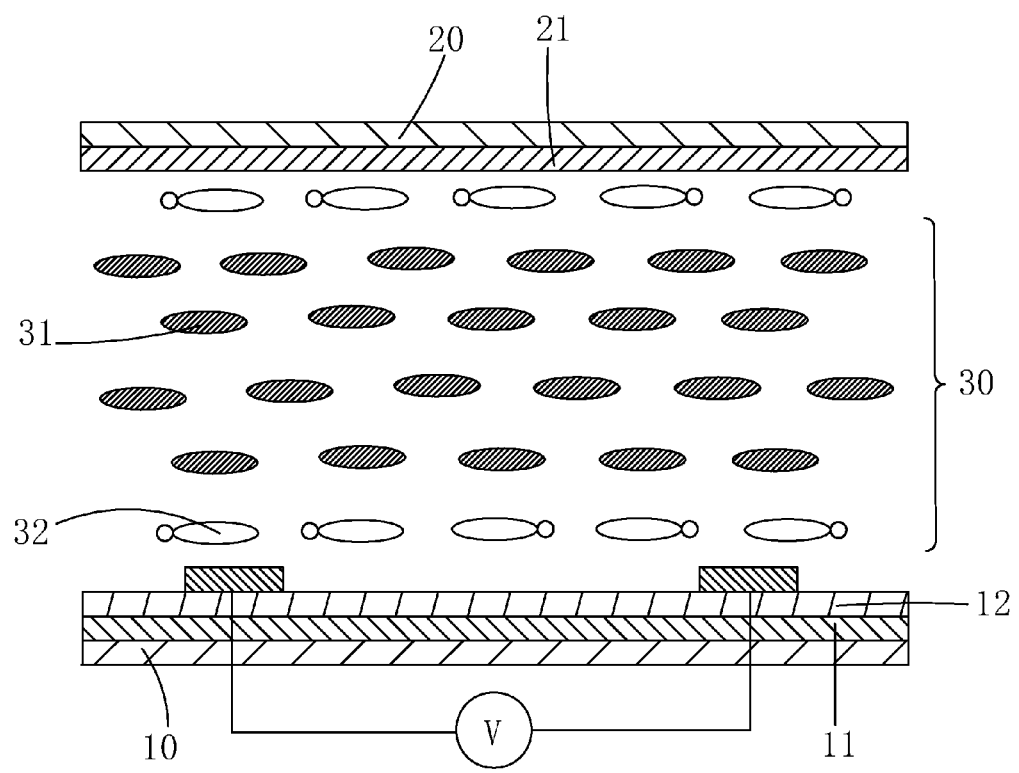
FIG. 3 is a cross-sectional view schematically illustrating the multiple steady state LCD panel when a voltage is applied to the horizontal electrodes.

As shown in FIG. 3, when only a strong enough voltage is applied to any two of the horizontal electrodes 13 to form a horizontal electric field, rotations of the positive liquid crystal molecules 31 along the direction of horizontal electric field occur under the alignment action of the bipolar low molecular weight alignment molecules 32, and then the positive liquid crystal molecules 31 are arranged parallel to the surfaces of the first substrate 10 and the second substrate 20. After that, even the applied voltage between the two horizontal electrodes is removed; the positive liquid crystal molecules 31 can still keep the state of being arranged parallel to the surfaces of the first substrate 10 and the second substrate 20 when the voltage was applied thereto.

The above two conditions as shown in FIG. 2 and FIG. 3 are more extreme, if adjusting the magnitude of voltage applied to the first plane electrode 11 and the second plane electrode 21, or adjusting the magnitude of voltage applied to any two of the horizontal electrodes 13, or simultaneously adjusting the magnitude of voltage applied to the first plane electrode 11 and the second plane electrode 21 and the magnitude of voltage applied to the two horizontal electrodes 13 is performed, then the positive liquid crystal molecules can be arranged at an inclined angle relative to the surfaces of the first substrate 10 and second substrate 20 under the alignment action of the bipolar low molecular weight alignment molecules. After that, even the applied voltage is removed, the positive liquid crystal molecules 31 can still keep the inclined alignment state when the voltage was applied thereto, so as to achieve the multiple steady state display that no longer requires continuously supplying voltage at a time of no need to change display data (i.e. static picture), and thus the energy consumption is reduced and the battery life of mobile display equipment is increased.

In summary, the multiple steady state LCD panel of the present application in which the side of the first substrate close to the liquid crystal layer has the first plane electrode and the spaced several horizontal electrodes disposed thereon, the side of second substrate close to the liquid crystal layer has the second plane electrode disposed thereon; the liquid crystal layer includes the plural positive liquid crystal molecules and the bipolar low molecular weight alignment molecules; thus, to adopt the PI materials for the horizontal or perpendicular alignment of the liquid crystal molecules is not needed for the present application. By controlling the content of the bipolar low molecular weight alignment molecules in the liquid crystal layer to allow the alignment condition being in the critical state that has neither strong perpendicular alignment nor strong horizontal alignment, the arrangement condition thereof is extremely easily affected by external electric field. By adjusting one or two of the voltage applied to the first plane electrode and the second plane electrode and the voltage applied to any two of the horizontal electrodes, the positive liquid crystal molecules are arranged at the specific angle under the alignment action of the bipolar low molecular weight alignment molecules. After the applied voltage was removed, the positive liquid crystal molecules can still keep the state when the voltage was applied thereto, so as to achieve the multiple steady state display that the LCD panel does not require continuously supplying electricity at displaying a static picture, and thus the energy consumption is reduced and the battery life of mobile display equipment is increased.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A multiple steady state liquid crystal display (LCD) panel, comprising a first substrate, a second substrate disposed opposite to the first substrate, a liquid crystal layer interposed between the first substrate and the second substrate, a first plane electrode covering the first substrate on a side of first substrate close to the liquid crystal layer, an insulation layer covering the first plane electrode, several horizontal electrodes spaced and disposed on the insulation layer, and a second plane electrode covering the second substrate on a side of the second substrate close to the liquid crystal layer;
wherein the liquid crystal layer includes plural positive liquid crystal molecules and bipolar low molecular weight alignment molecules, a structural formula of the bipolar low molecular weight alignment molecules is

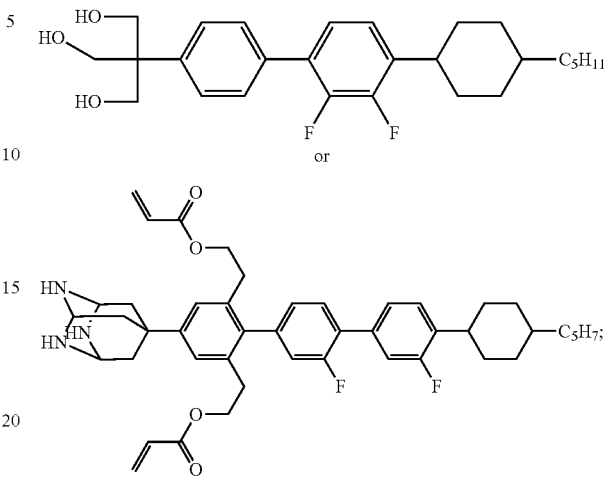

by adjusting a voltage applied to the first plane electrode and the second plane electrode and/or a voltage applied to any two of the horizontal electrodes, the positive liquid crystal molecules are arranged at a specific angle under an alignment action of the bipolar low molecular weight alignment molecules, after the applied voltage is removed, the positive liquid crystal molecules can still keep at the specific angle, so as to achieve a multiple steady state display.

2. The multiple steady state liquid crystal display (LCD) panel according to claim 1, wherein the bipolar low molecular weight alignment molecules account for 0.02%~5% by weight of the liquid crystal layer.

3. The multiple steady state liquid crystal display (LCD) panel according to claim 1, wherein a material of the insulation layer is silicon nitride, silicon oxide or a combination thereof.

4. The multiple steady state liquid crystal display (LCD) panel according to claim 1, wherein materials of the first plane electrode, the second plane electrode, and the several horizontal electrodes are indium tin oxide (ITO).

5. The multiple steady state liquid crystal display (LCD) panel according to claim 1, wherein one of the first substrate and the second substrate is a thin-film transistor (TFT) substrate, the other one is a color filter (CF) substrate.

6. The multiple steady state liquid crystal display (LCD) panel according to claim 1, wherein an amount of the horizontal electrodes is two.

7. A multiple steady state liquid crystal display (LCD) panel, comprising a first substrate, a second substrate disposed opposite to the first substrate, a liquid crystal layer interposed between the first substrate and the second substrate, a first plane electrode covering the first substrate on a side of first substrate close to the liquid crystal layer, an insulation layer covering the first plane electrode, several horizontal electrodes spaced and disposed on the insulation layer, and a second plane electrode covering the second substrate on a side of the second substrate close to the liquid crystal layer;
wherein the liquid crystal layer includes plural positive liquid crystal molecules and bipolar low molecular weight alignment molecules, a structural formula of the bipolar low molecular weight alignment molecules is

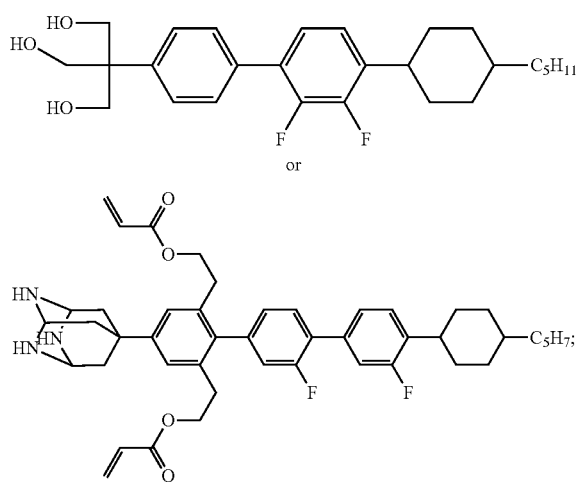

by adjusting a voltage applied to the first plane electrode and the second plane electrode and/or a voltage applied to any two of the horizontal electrodes, the positive liquid crystal molecules are arranged at a specific angle under an alignment action of the bipolar low molecular weight alignment molecules, after the applied voltage is removed, the positive liquid crystal molecules can still keep at the specific angle, so as to achieve a multiple steady state display;

wherein a material of the insulation layer is silicon nitride, silicon oxide or a combination thereof;

wherein materials of the first plane electrode, the second plane electrode, and the several horizontal electrodes are indium tin oxide (ITO);

wherein one of the first substrate and the second substrate is a thin-film transistor (TFT) substrate, the other one is a color filter (CF) substrate.

8. The multiple steady state liquid crystal display (LCD) panel according to claim 7, wherein the bipolar low molecular weight alignment molecules account for 0.02%~5% by weight of the liquid crystal layer.

9. The multiple steady state liquid crystal display (LCD) panel according to claim 7, wherein an amount of the horizontal electrodes is two.

* * * * *